(12) United States Patent  (10) Patent No.: US 9,014,500 B2
Shuster et al.  (45) Date of Patent: Apr. 21, 2015

(54) DIGITAL MEDIA ENHANCEMENT SYSTEM, METHOD, AND APPARATUS

(71) Applicants: Gary Shuster, Fresno, CA (US); Brian Shuster, Vancouver (CA)

(72) Inventors: Gary Shuster, Fresno, CA (US); Brian Shuster, Vancouver (CA)

(73) Assignees: Gary Shuster, Fresno, CA (US); Brian Shuster, Vancouver (CA)

( * ) Notice: Subject to any disclaimer, the term of this patent is extended or adjusted under 35 U.S.C. 154(b) by 222 days.

(21) Appl. No.: 13/736,902

(22) Filed: Jan. 8, 2013

(65) Prior Publication Data

US 2013/0176442 A1   Jul. 11, 2013

Related U.S. Application Data

(60) Provisional application No. 61/584,308, filed on Jan. 8, 2012, provisional application No. 61/584,305, filed on Jan. 8, 2012.

(51) Int. Cl.
*G06K 9/40* (2006.01)
*H04N 5/225* (2006.01)
*G06K 9/62* (2006.01)
*G06T 11/60* (2006.01)

(52) U.S. Cl.
CPC .............. *H04N 5/225* (2013.01); *G06K 9/62* (2013.01); *G06T 11/60* (2013.01)

(58) Field of Classification Search
None
See application file for complete search history.

(56) References Cited

U.S. PATENT DOCUMENTS

| 6,184,937 | B1 * | 2/2001 | Williams et al. | 348/515 |
| 7,031,547 | B2 * | 4/2006 | Kokemohr | 382/260 |
| 7,730,043 | B1 * | 6/2010 | Bourdev | 707/695 |
| 8,612,517 | B1 * | 12/2013 | Yadid et al. | 709/203 |
| 8,768,070 | B2 * | 7/2014 | Gelfand et al. | 382/224 |
| 2010/0046843 | A1 * | 2/2010 | Ma et al. | 382/224 |
| 2011/0283309 | A1 * | 11/2011 | Bliss et al. | 725/25 |
| 2013/0129158 | A1 * | 5/2013 | Wang et al. | 382/118 |

* cited by examiner

*Primary Examiner* — Daniel Mariam (57) ABSTRACT

Aspects are disclosed for enhancing digital media. In an aspect, a target object in a primary image is identified, and reference images that include the target object are located. The target object is then modified within the primary image according to data derived from analyzing the reference image. In another aspect, a primary file is received, and at least one reference file is referenced to generate enhancement data that facilitates enhancing the primary file from an extrapolation of the reference file. In yet another aspect, media files corresponding to a common event are aggregated, and a desired enhancement of a primary file is identified. Here, the desired enhancement corresponds to a modification of an obstruction included in the primary file. A reference file which includes data associated with the desired enhancement is then referenced, and the obstructed data is modified based on replacement data extrapolated from the reference file.

20 Claims, 6 Drawing Sheets

DIGITAL MEDIA ENHANCEMENT SYSTEM, METHOD, AND APPARATUS

CROSS-REFERENCE TO RELATED APPLICATIONS

This application claims the benefit of U.S. Provisional Patent Application Ser. No. 61/584,308, filed Jan. 8, 2012, which is titled "DIGITAL MEDIA ENHANCEMENT SYSTEM, METHOD, AND APPARATUS," U.S. Provisional Patent Application Ser. No. 61/584,305, filed Jan. 8, 2012, which is titled "CLOTHING AND BODY COVERING PATTERN CREATION MACHINE AND METHOD," and their entire contents of which are incorporated herein by reference.

TECHNICAL FIELD

The subject disclosure generally relates to digital media enhancement, and more specifically towards enhancing digital media files based on data ascertained from reference files.

BACKGROUND

By way of background concerning conventional digital media enhancement devices, it is noted that enhancements performed by such devices are undesirably limited by the particular information included in the file to be enhanced. For instance, when attempting to remove an obstruction from an image, conventional tools can be used to replace pixels of the obstruction with pixels proximate to the obstruction. Namely, conventional methods replace such pixels without actual knowledge of what is behind the obstruction. Similarly, removing noise from an audio file is limited to applying noise-cancelling filters, wherein actual knowledge of the audio without noise is not known.

Accordingly, it would be desirable to provide a digital enhancement device which overcomes these limitations. To this end, it should be noted that the above-described deficiencies are merely intended to provide an overview of some of the problems of conventional systems, and are not intended to be exhaustive. Other problems with the state of the art and corresponding benefits of various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with digital media enhancement devices. In one such aspect, a device is provided, which includes a computer, a computer readable memory having one or more computer executable components stored thereon, and a processor configured to execute the one or more computer executable components in order to cause the computer to perform various actions. The actions include identifying a target object in a primary image, and searching a plurality of images to locate at least one reference image that includes at least a portion of the target object. The actions further include modifying at least one characteristic of the target object within the primary image according to data derived from an analysis of the at least one reference image.

In another aspect, a device is provided, which also includes a computer, a computer readable memory having one or more computer executable components stored thereon, and a processor configured to execute the one or more computer executable components in order to cause the computer to perform various actions. For this particular embodiment, the actions include receiving a primary digital file, referencing at least one reference digital file, and generating enhancement data that facilitates enhancing an aspect of the primary digital file from an extrapolation of the at least one reference digital file.

In a further aspect, another device is provided, which also includes a computer, a computer readable memory having one or more computer executable components stored thereon, and a processor configured to execute the one or more computer executable components in order to cause the computer to perform various actions. The actions include aggregating a plurality of digital media files corresponding to a common event, and identifying a desired enhancement of a primary digital media file. Within such embodiment, the desired enhancement corresponds to a modification of data associated with an obstruction included in the primary digital media file. The actions further comprise referencing at least one reference file which includes data associated with the desired enhancement, and modifying the data associated with the obstruction included in the primary digital media file based on replacement data extrapolated from the at least one reference file.

Other embodiments and various non-limiting examples, scenarios and implementations are described in more detail below.

OVERVIEW

Figure 1:
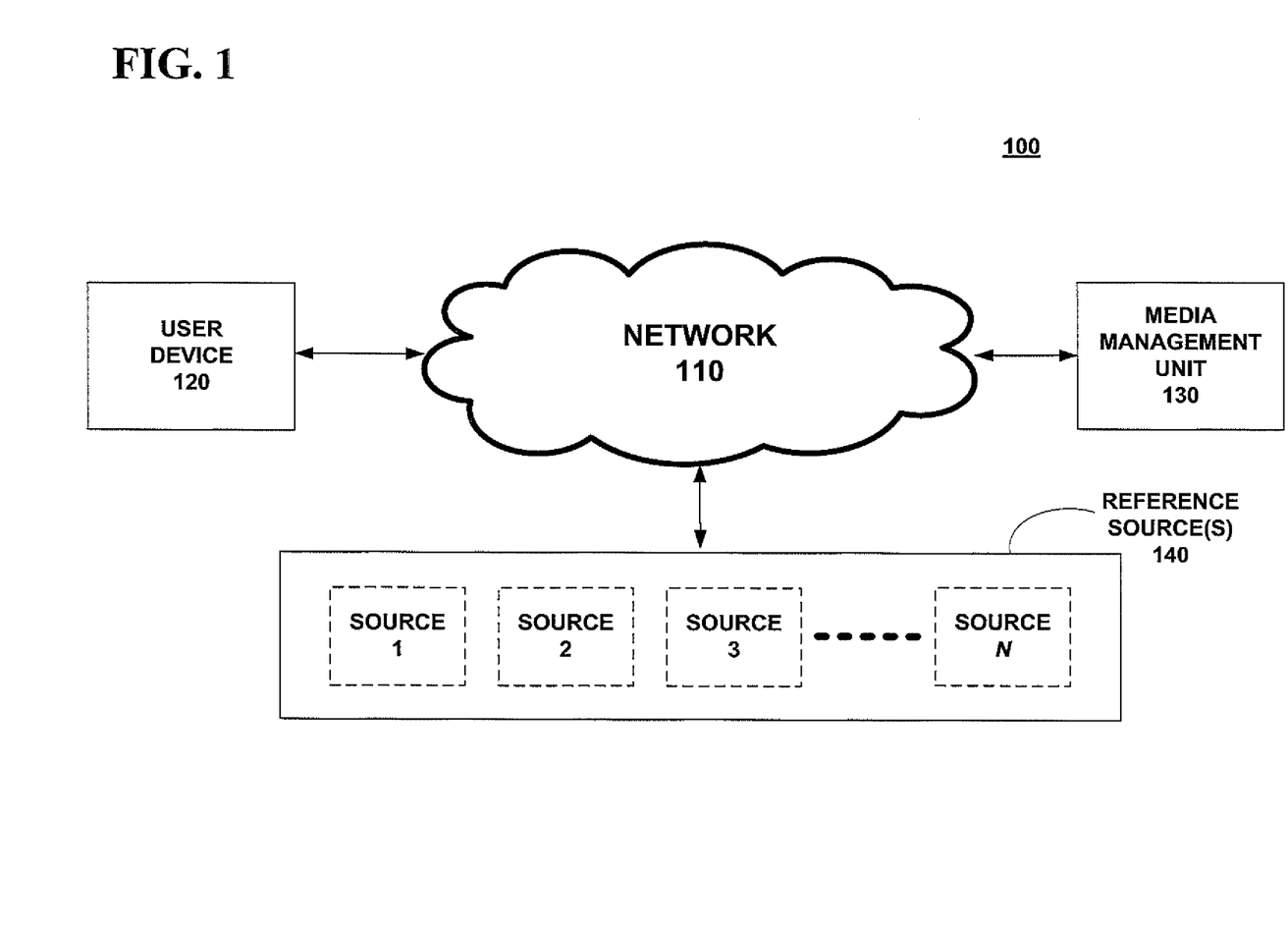
FIG. 1 illustrates an exemplary environment that facilitates enhancing digital media in accordance with an aspect of the subject specification.

The present disclosure relates to the enhancement of digital media. In FIG. 1, an exemplary environment that facilitates such enhancement is provided. As illustrated, environment 100 includes user device 120, which is coupled to media management unit 130, and reference source(s) 140 via network 110. Here, it should be noted that user device 120 can be any computing device configured to receive an input from a user (e.g., a mobile device, personal computer, etc.), wherein user device 120 and media management unit 130 can be distinct entities or integrated into a single device. In one aspect, user device 120 is configured to provide and/or select digital media (hereinafter defined to include digital content) to be enhanced by media management unit 130 according to data ascertained from reference source(s) 140. For instance, in an exemplary embodiment, a user provides/selects a photograph via user device 120, wherein the photograph includes characteristics the user wishes to edit via media management unit 130. Within such embodiment, media management unit 130 is configured to extrapolate and/or extract data from at least one reference image retrieved from reference source(s) 140. The extrapolated data is then used to edit and/or enhance the photograph as desired by the user.

In another aspect, an entirely automated system is contemplated with no user input. For example, in a baseball game where the stands are empty, the automated system may automatically add stock photography or video or stills taken from one or more video frames) of full seats to avoid having it look like the stadium is empty. Similarly, a camera transmitting from a fixed area (e.g., the Rose Garden at the White House) may utilize a reference image of the background so that aides walking in the background, trash inadvertently dropped, etc, do not show up in the video feed.

Figure 2:
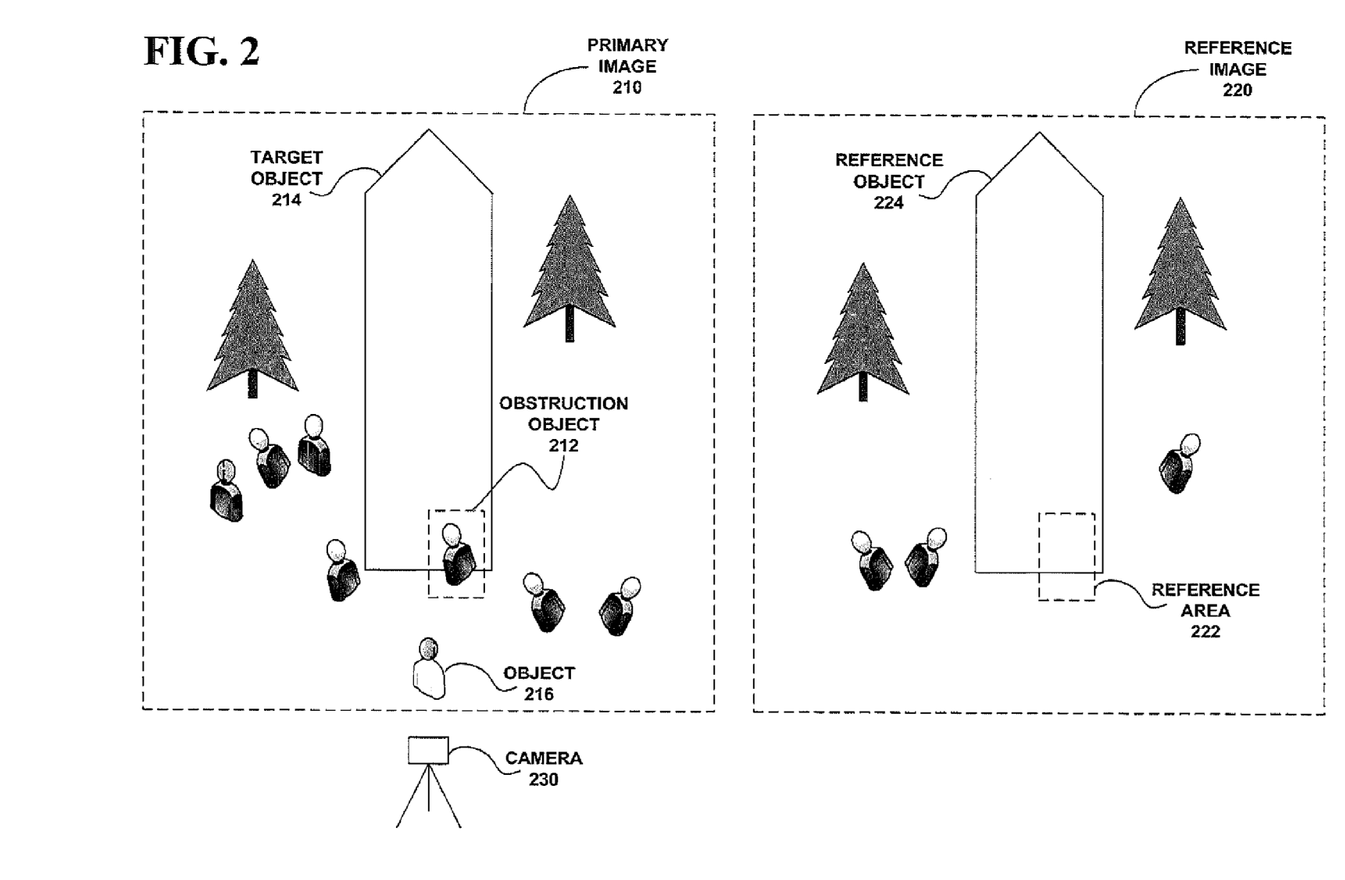
FIG. 2 illustrates an exemplary primary image and exemplary reference image according to an embodiment.

Referring next to FIG. 2, an exemplary primary image and exemplary reference image according to an embodiment is provided. For this particular example, it is assumed that primary image 210 was taken by camera 230, wherein a user was attempting to photograph object 216 in front of target object 214. Here, it is further assumed that the user would like to remove obstruction object 212 from primary image 210. To facilitate such removal, a search can be performed for images similar to primary image 210 in which target object 214 is unobstructed by obstruction object 212 (e.g., via an image search for target object 214). In this example, reference image 220 is found, which includes reference object 224, wherein reference object 224 is unobstructed view by obstruction object 212. Data extrapolated from reference area 222 within reference image 220 can then be used to remove obstruction object 212 from primary image 210 (e.g., by replacing pixel data corresponding to obstruction object 212 with pixel data corresponding to reference area 222).

Here, it should be appreciated that the search, replacement, and/or modification of target objects can be performed in any of a plurality of ways. In one aspect, for example, it may be desirable to utilize a reference object that is the same as the target object (e.g., where the target object and the reference object are both the Eiffel tower). In another aspect, however, simply utilizing a reference object that is similar to the target object may suffice (e.g., a reference object of a generic football, wherein the target object is a particular football). In yet another aspect, a target object might be replaced/modified by identifying objects that humans may perceive to be related to a context of the primary image (e.g., replacing an obstruction to the Statue of Liberty with a flag of the United States).

In a further aspect, the area obscured by an obstruction object may be replaced by one or more visually compatible objects (optionally set on top of pixels with characteristics inferred by the characteristics of pixels surrounding the obstruction object), where the visually compatible objects are objects similar to other objects in the image and/or are objects similar or identical to objects appearing in similar reference images. Taking as an example a photograph taken on a beach, where there are numerous beach-goers, but one of the beach-goers has covered his body with visually jarring body paint, making him essentially an obstruction object. It may be undesirable to duplicate a person from the same image and have that person appear twice, as it makes it obvious that the photograph has been altered. Rather, the painted person may be replaced with an image of a person in a bathing suit taken from another image of a beach, which image may be selected based on comparable location, time, date, visual qualities, weather, time of year, white balance, photographic equipment used, or other criteria. Alternatively, if the identity of the person is ascertainable, a search for a more desirable image of the same painted person may be performed (e.g., an archived image of the painted person without the body paint), wherein the painted person image is replaced accordingly.

Figure 3:
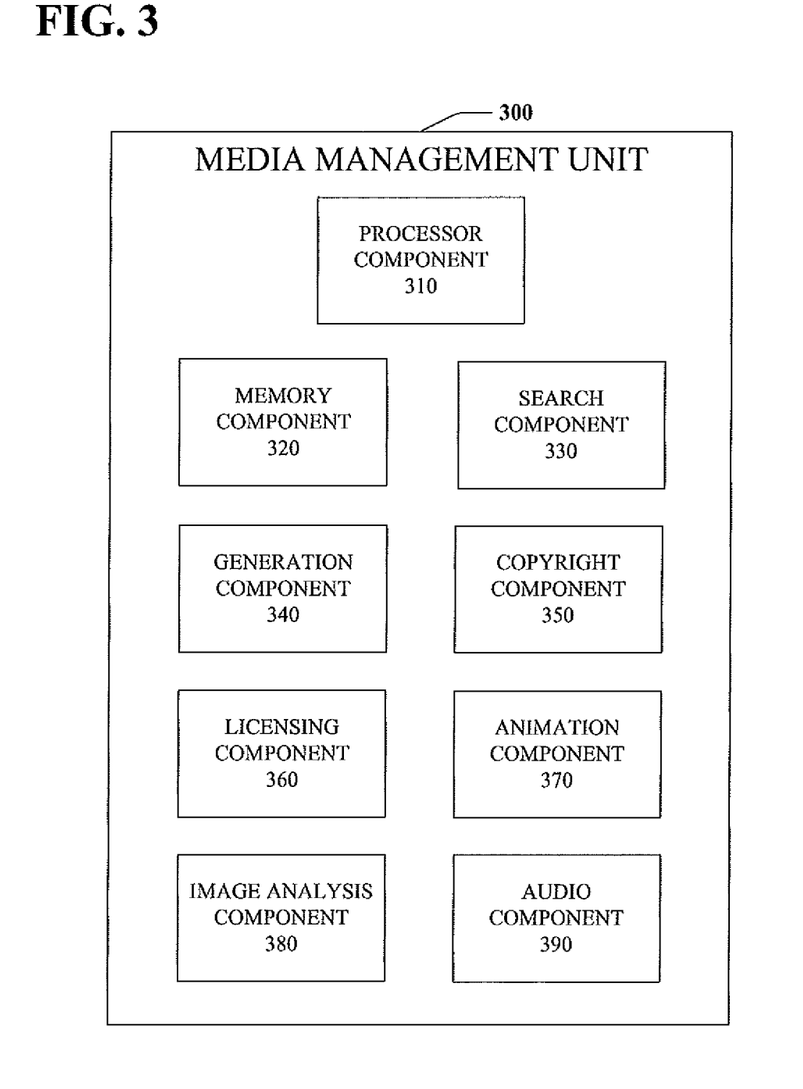
FIG. 3 illustrates a block diagram of an exemplary media management unit that facilitates enhancing digital media in accordance with an aspect of the subject specification.

Referring next to FIG. 3, a block diagram of an exemplary media management unit that facilitates enhancing digital media according to an embodiment is illustrated. As shown, media management unit 300 may include processor component 310, memory component 320, search component 330, generation component 340, copyright component 350, licensing component 360, animation component 370, image analysis component 380, and audio component 390. Here, it should be noted that processor component 310, memory component 320, search component 330, generation component 340, copyright component 350, licensing component 360, animation component 370, image analysis component 380, and/or audio component 390 can reside together in a single location or separated in different locations in various combinations including, for example, a configuration in which any of the aforementioned components may reside in a cloud. For instance, with reference to FIG. 1, it is contemplated that these components may reside, alone or in combination, in either of user device 120, media management unit 130, and/or reference source(s) 140.

In one aspect, processor component 310 is configured to execute computer-readable instructions related to performing any of a plurality of functions. Processor component 310 can be a single processor or a plurality of processors which analyze and/or generate information utilized by memory component 320, search component 330, generation component 340, copyright component 350, licensing component 360, animation component 370, image analysis component 380, and/or audio component 390. Additionally or alternatively, processor component 310 may be configured to control one or more components of media management unit 300.

In another aspect, memory component 320 is coupled to processor component 310 and configured to store computer-readable instructions executed by processor component 310. Memory component 320 may also be configured to store any of a plurality of other types of data including data generated by any of search component 330, generation component 340, copyright component 350, licensing component 360, and/or animation component 370. Memory component 320 can be configured in a number of different configurations, including as random access memory, battery-backed memory, Solid State memory, hard disk, magnetic tape, etc. Various features can also be implemented upon memory component 320, such as compression and automatic back up (e.g., use of a Redundant Array of Independent Drives configuration). In one aspect, the memory may be located on a network, such as a "cloud storage" solution.

In another aspect, where a reference object is to be utilized in a manner that requires or may require a copyright license, a description of the desired reference object may be communicated to one or more purveyors of images or image data (or a search may be made of such purveyor's available images). Once candidate images are located, proposed use information may optionally be transmitted to such purveyors. In one implementation, such purveyors, by automated process or otherwise, are requested to submit bids for pricing. In another implementation, the system submits a pricing bid. The pricing data is incorporated into a decision making process that optionally utilizes data relating to the quality and/or desirability and/or qualities of the offered copyright license of the reference images that are subject to the bidding, and determines which of the reference images to purchase. Such purchase then takes place and the reference image (or images) is obtained.

In another aspect, processed images each incorporating changes based on data from one or more of a plurality of potential reference images are generated and presented over a network for review by humans. In one implementation, a plurality of humans may vote in the desirability of the images and the voting results utilized to determine which reference images to use, or to influence such decision.

In yet another aspect, media management unit 300 includes search component 330, as shown. Within such embodiment, search component 330 is configured to search for any of a plurality of content and/or digital media types. Namely, it is contemplated that search component 330 may be configured to search various data sources to find reference media files related to a primary media file of which digital enhancement is desired. For instance, with respect to FIG. 2, search component 330 may be coupled to image analysis component 380 and configured to search for images similar to primary image 210 in which target object 214 is unobstructed by obstruction object 212 (e.g., via an image search for target object 214, a search for metadata associated with target object 214, etc.). In another aspect, search component 330 may be configured to obtain results using an imperfect search that imperfectly meets requirements for the desired content. Those search results may then be filtered or additionally searched using another search. In one aspect, an initial search may be done using a search engine such as Google Images, regardless of whether it is accessed directly as part of the system or through an API or other method. Search component 330, or the element that conducts the imperfect search, may optionally be operated by a third party.

Search component 330 may also be configured to perform searches for other types of digital media (e.g., video files, audio files, etc.). For instance, in a scenario where an individual wishes to enhance video he/she recorded of a particular event (e.g., an inauguration speech, a school play, etc.), search component 330 may be configured to perform a search in which videos recorded by other people at the same event are identified and/or aggregated (e.g., aggregating videos of the event stored in a cloud). Here, one or more such videos may serve as reference videos to facilitate enhancing aspects of the primary video recorded by the individual. Indeed, the primary video may include a visual obstruction (e.g., a person's head obstructing a view of a podium), audio obstruction (e.g., a conversation obstructing audio of a speech), or other type of obstruction, wherein data from reference videos retrieved by search component 330 may be used to remove/mitigate such obstructions. In another aspect, reference images, video and/or audio may be utilized to determine the elements that are present on the user's video but not in some or all of the reference video. In this way, for example, a conversation that is taking place close to the user may be enhanced or made audible by removing the audio matching audio present at a distance from where the user recorded the event. In yet another aspect, search component 330 is coupled to audio component 390 and configured to search for reference audio files.

In another aspect, the processing of such information may be conducted in real time or substantially in real time. In one aspect, the real time processed data may be made available to one or more end users such that the end user making a video (or taking photos) of an event sees the processed data in his or her digital viewfinder (in addition to or in alteration with the native video).

In another aspect, the processing of such information in near real time may be utilized for safety and security purposes. In one aspect, by isolating conversations as described above, automated (or non-automated) processes may be used to listen for key words or phrases, and/or for certain sounds (for example, the sound of a round being chambered in a weapon). Similarly, the behavior of persons in a given area may be analyzed by automated processes and anomalies identified by identifying behaviors that are outliers. For example, when taking video of a Presidential inauguration, if there are only a few people whose eyes are visible to the camera where the President's face is also visible, this is an indication that they are not watching the President and are therefore potentially engaging in dangerous behavior. Similarly, because hundreds or thousands of individual video streams have the capability of identifying detail and seeing angles unavailable to mounted or other traditional security cameras, behaviors such as keeping one hand inside of a jacket and having the portion of the jacket a few inches distal from the hand every time the hand moves (i.e. movement consistent with holding a gun) may be identified and passed on to law enforcement for action. The location of the subject may further be identified using GPS, triangulation, or analysis of the image in conjunction with at least one other image of the area.

In another aspect, real time or near real time aggregation of video and/or audio and/or still images may be utilized to identify events happening at a distance. For example, the location of an explosion or a gunshot may be determined by triangulating the sound found on a plurality of audio recordings taken at locations within range of the sound (such as video recordings with geographic metadata and audio tracks). In another aspect, celestial events may be identified, such as the likely landing point of a meteor. Such identification may be done, for example, by triangulation of the impact sound and/or by analysis of a plurality of video or still images, preferably together with location data for such video or still images. In another aspect, the presence of enemy or other objects may be identified by comparing objects found in video (such as the night sky behind primary objects in a plurality of videos) with data about expected objects (such as air traffic control data). Taking as an example an aircraft flying low over the border and transporting drugs, if a plurality of people were streaming video to a social networking site, and each of those videos identified a lighted object (or a dark object obscuring lighted points such as stars), such information may be utilized to identify the object as a potential aircraft and even to track the object. Sound data may be utilized to further refine the analysis (or as the sole source of analysis). Such data may also be utilized to identify inbound missiles or other threats. For example, Tel Aviv is frequently the subject of unguided missile attacks. The aspects disclosed herein may be utilized to identify such attacks and plot a course and likely landing point for such missile, and to dispatch an interceptor and/or first responders to the likely landing points. In one aspect, those taking the video and/or audio may be incentivized to share it with the system by providing them with live warnings and/or live versions of the processed data. In another aspect, warnings may be sent to users via various devices, including the devices doing the tracking. In another aspect, where there is insufficient data to fully or accurately track threats or other events, devices may be activated by remote signal (optionally with the permission of the device owner).

Additional sources of video and/or audio may also be utilized, including such sources as traffic cameras, ATM cameras, audio from landline telephones, audio from regular cellular calls, and video from police dash-cameras. For fixed location sources, the location data may be associated with the source. During periods of national emergency, with user permission, or based on other criteria, not only may audio from ongoing cellular or other calls be used, but microphones and/or video cameras may be remotely actuated and the data utilized for the purposes described herein.

With regard to triangulation of an audio source, it is possible to use as few as one audio tracking source to at least partially triangulate the course of a moving target. Taking, for example, an aircraft, the audio signature of the engine and wind passing over the wings may indicate that it is a Cessna single engine fixed gear aircraft. With that information, the expected sound characteristics of the aircraft may be utilized to refine the triangulation. Where the audio tracking receiver is moving (such as a cellular phone in a vehicle), and where data about the location of the receiver is available (such as GPS data), the sound characteristics of the target may be received, correction applied for the movement of the receiver, and the number of possible locations and paths of the target object reduced and the possible locations and paths identified. Such data may be utilized to determine which additional receivers to monitor and/or actuate. Signal strength is another indicator that may be utilized to determine threats. For example, a device that has high signal strength momentarily and then drops in signal strength, is an indication that the phone or other signal source may have been removed from a shielding device (whether the shielding is intentional or incidental to the nature of the case, such as placing a phone into a suitcase shielded against detection of a dirty bomb contained therein).

As illustrated, media management unit 300 may also include generation component 340. In an aspect, generation component 340 is configured to generate enhancement data extrapolated from reference media files, which can then be used to enhance a primary media file. For instance, with reference to FIG. 2, generation component 340 may be configured to generate enhancement data which associates reference area 222 with obstruction object 212, wherein such enhancement data facilitates removing obstruction object 212 from primary image 210. To this end, it is contemplated that enhancement data generated by generation component 340 can facilitate enhancing a primary media file in any of various ways. For example, such enhancement data can be a new media file in which pixel data corresponding to obstruction object 212 is replaced with pixel data corresponding to reference area 222. In another aspect, rather than a new media file, such enhancement data may simply include pixel data corresponding to reference area 222 which the user can subsequently use to replace/mask obstruction object 212.

Since digital files may be subject to copyright protection, media management unit 300 may further include copyright component 350. Moreover, since determining whether a file is subject to copyright protection may be desirable (e.g., to avoid liability, to provide compensation to the copyright owner, etc.), copyright component 350 may be configured to track/index files that are subject to copyright protection. In an aspect, copyright component 350 may be configured to work in conjunction with search component 330, wherein digital files retrieved by search component 330 are filtered and/or prioritized according to their respective copyright status. In another aspect, copyright component 350 may be configured to incorporate a composite of pixels/data from various reference files into an enhanced version of a primary file, wherein no single reference file is the source of a sufficient number of pixels/data as to constitute copyright infringement. Copyright status may be identified by reference to a web page linking to the content, by reference to metadata in the content itself, by reference to a clearinghouse, by utilization of the methods taught in U.S. Pat. No. 6,826,546 which is hereby incorporated by reference, or otherwise.

As illustrated, media management unit 300 may further include licensing component 360. For these embodiments, licensing component 360 may be configured to implement a clearinghouse or similar licensing model where copyright holders make digital files available to users of media management unit 300. Licensing component 360 may be further configured to ascertain a license fee based on any of a plurality of factors including, for example, an editing mode, an amount of an image/file being utilized, a number of reference files being utilized, a type and/or length of rights being acquired, an increase in rights being acquired over an existing license (e.g., elimination of the attribution requirement in a Creative Commons Attribution license), a relative importance of the licensed reference file relative to other reference files being used, or a combination. Licensing component 360 may also be configured to compute a splitting of licensing fees between reference file copyright holders, wherein such split may be based in whole or part on the same factors described above as influencing license price. Where appropriate, license limitations (such as a Creative Commons Attribution license attribution requirement) may be managed by the licensing component 360, and provided to the end user, complied with automatically (such as by incorporation of required data into the image or metadata), or otherwise tracked.

In another aspect, media management unit 300 further includes animation component 370. Within such embodiment, animation component 370 may be configured to ascertain/retrieve/generate media associated with an input based on an analysis of the input. For instance, animation component 370 may be configured to parse a textual input (e.g., a book excerpt) and output any of various types of media corresponding to the textual input. In an exemplary scenario, animation component 370 may be configured to infer a context for a textual input, wherein the input is a book excerpt in which a 'stormy night' scene is inferred from a textual analysis of the input. Animation component 370 may then be further configured to ascertain/retrieve/generate media associated with a 'stormy night' scene such as an image file (e.g., a photo/drawing of an evening lightning storm), audio file (e.g., audio of lightning), and/or video file (video of an evening lightning storm). In another exemplary scenario, the input is a screenplay, wherein animation component 370 may be configured to generate distinct avatars for each of the screenplay's characters, and/or wherein animation component 370 may be configured to ascertain/retrieve/generate background music for particular scenes (e.g., "suspenseful" music for a suspenseful scene) by searching for such music based on any of several factors including, for example, explicit instructions embedded within the screenplay text (e.g., embedding a "#suspenseful_music" hash tag in a comment portion of the screenplay), and/or inferred instructions extrapolated from an aggregation of keywords within the screenplay text (e.g., inferring a search for "suspenseful" music based on an aggregation of suspense-related keywords such as "knife", "chase", etc., within a scene's text, wherein search results may include "suspenseful" music used on scenes of reference screenplays having similar keywords). In yet another exemplary scenario, the input is a photo of an individual, wherein animation component 370 may be configured to retrieve links/files related to the individual (e.g., a biographical text file, hyperlinks to news articles, a background check of the individual, etc.). In another aspect, data about how to render images, video or audio may be obtained by analysis of reference images, video or audio and such data utilized to render images, video or audio to complement or replace the original input.

It should be noted that animation component 370 may work in conjunction with search component 330 and generation component 340 to ascertain/retrieve/generate the aforementioned media. Namely, as stated previously, search component 330 may be configured to retrieve reference media files related to a primary media file of which digital enhancement is desired, whereas generation component 340 is configured to generate enhancement data extrapolated from such reference media files. Accordingly, animation component 370 may be coupled to each of search component 330 and generation component 340, wherein an input to animation component 370 (e.g., a book excerpt describing a 'stormy night' scene) may correspond to the aforementioned primary media file of which reference media files are retrieved (e.g., files related to a stormy night), and wherein animation component 370 may be configured to output enhancement data extrapolated from the reference media files (e.g., an image of a stormy night).

Figure 4:
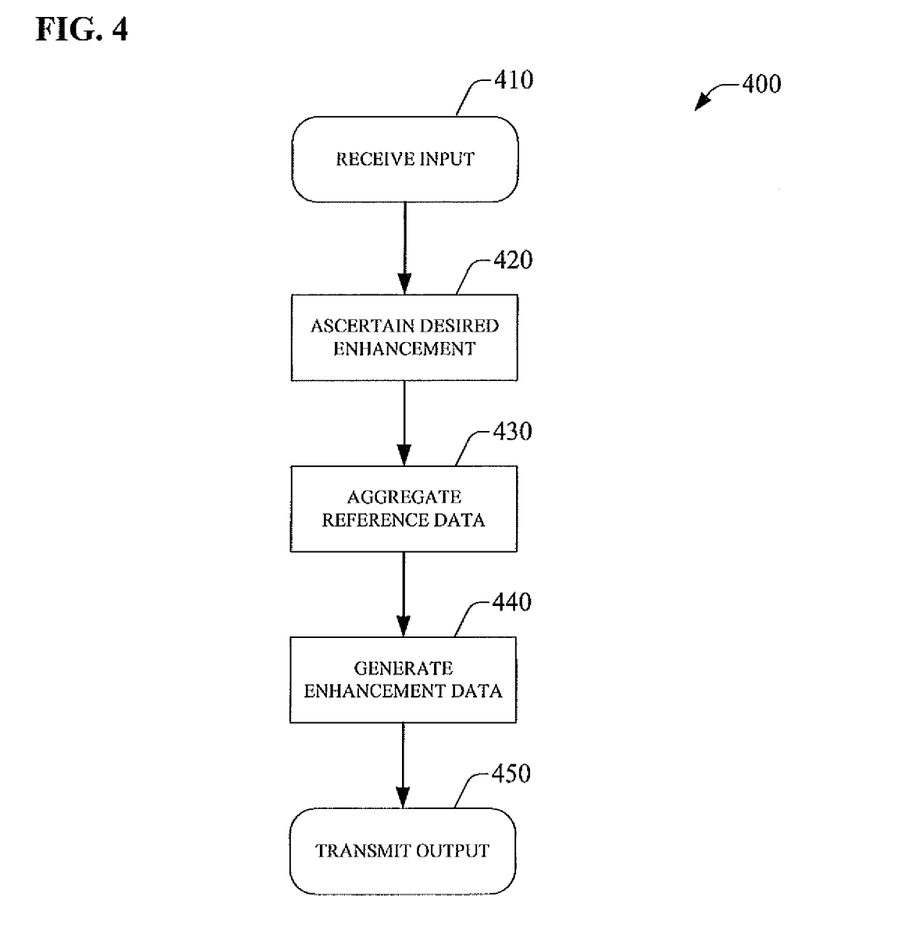
FIG. 4 illustrates a flow diagram of an exemplary methodology that facilitates enhancing digital media according to an embodiment.

Referring next to FIG. 4, a flow chart illustrating an exemplary method for enhancing digital media is provided. As illustrated, process 400 includes a series of acts that may be performed within a computer system (e.g., media management unit 300) according to an aspect of the subject specification. For instance, process 400 may be implemented by employing a processor to execute computer executable instructions stored on a computer readable storage medium to implement the series of acts. In another embodiment, a computer-readable storage medium comprising code for causing at least one computer to implement the acts of process 400 is contemplated.

In an aspect, process 400 begins with a user input being received at act 410. Here, it is contemplated that such input may include and/or identify a media file the user wishes to enhance. Moreover, it is contemplated that a user may include an actual media file, and/or a user may simply reference a media file by, for example, providing a link to such file. Once the input is received, process 400 proceeds to act 420 where a desired enhancement is ascertained. As stated previously, such enhancement may include the removal/mitigation of an obstruction, an inferred animation, etc., wherein an indication of the particularly desired enhancement(s) may be included as part of the input.

After ascertaining the desired enhancement, process 400 proceeds to act 430 where reference data is aggregated. To this end, it is noted that such reference data can be aggregated according to any of a plurality of factors including, for example, metadata and/or objects associated with the media file received/identified at act 410, copyright/licensing restrictions associated with candidate reference files, the desired enhancement(s) ascertained at act 420, etc.

Next, at act 440, enhancement data is generated according to information extrapolated from reference media files. For instance, as stated previously with reference to FIG. 2, enhancement data may be generated which associates reference area 222 with obstruction object 212, wherein such enhancement data facilitates removing obstruction object 212 from primary image 210. Process 400 then concludes with the enhancement data being output at act 450.

In an exemplary use of the aspects described herein, photos inferred to be associated with a written story are retrieved/generated to use as "visualizers" when the story is read as an audiobook and/or when the story is rendered on a page. To this end, the aspects described herein can thus be implemented to provide video/photo accompaniment to a written work that is being read as an audiobook. For example, a child may write a simple story such as "My dog is a collie name Fred. My dog like to chase cats. I love my dog." The story may be rendered on three pages, once for each sentence. For the first page, a photograph of a collie is identified (possibly from the child's family's photo collection). For the second page, a photograph of a collie chasing cats may be identified and used. For the third page, hearts may be rendered. Such technology may be utilized to generate video accompaniments as well. For music, a "music video" may be generated as a visualization where photographs or video of elements contextual to the lyrics or other music content may be generated. For example, the sound of canon fire may be used to bring up photographs of canons, while the lyric "all of the way to the moon" may generate a video of the moon.

In another exemplary use of the aspects described herein, aggregated media files can be analyzed for social/professional networking purposes. For instance, aspects of a particular user's media files can be analyzed and compared to those of other users. Potential social/professional networking matches can then be suggested based on particular similarities between users (e.g., by analyzing/comparing a digital file's metadata). For instance, people with similar music preferences can be identified by analyzing metadata associated with users' audio files, playlists, etc. Users' photo albums can also be analyzed to match users with similar photographic preferences/tendencies (e.g., by analyzing location metadata to match users who take photos from similar locations).

In yet another aspect, it should be appreciated that the aggregation and analysis of media files can be combined with information ascertained from non-media files/sources. For instance, information regarding a user's "likes" obtained from social networking websites (e.g., FaceBook®, LinkedIn®, etc) can be used to further profile the user for potential networking matches (e.g., matching people who "like" similar bands in addition to having similar music-related media files). Information regarding a user's location can also be used for networking purposes. For example, location data obtained from a user's mobile device may be used to automatically identify nearby users who share similar music preferences (e.g., matching strangers at a coffee shop who have similar music-related media files). Anonymity can also be preserved by allowing users to modify their level of participation in such networking opportunities, as desired.

In one aspect, data obtained by a mobile device may be utilized to identify personal characteristics or patterns of a user. For example, a user of a portable device may visit the zoo twice a month, never visit the bird exhibits, spend 50% of her time at the Gorilla exhibit, and 40% of her time at exhibits of predators. Another user with very similar patterns of zoo visits and exhibits of interest may be identified and offered as a possible friend or date. Similarly, potential carpool partners may be identified by tracking the frequently driven or traveled paths of people and/or their destinations.

DETAILED DESCRIPTION

Image manipulation and enhancement have existed in various forms since the creation of the first images. With the introduction of analog photography, photographers developed techniques to manipulate images during the initial exposure process and during the printing process. Digital photography has made digital editing machines, such as computers utilizing Adobe™ Photoshop™ software, standard tools for photographers.

Early digital editing devices provided computer assistance for tasks that humans previously had to perform in a darkroom. For example, digital editors would include the ability to digitally "burn" or "dodge" portions of images or convert a color image to grayscale. Other film-era techniques, such as "airbrushing" and drawing colors onto a grayscale image to "colorize" it were similarly incorporated into the function of digital editing machines. Eventually, functions that were difficult, impractical or impossible to do without a digital editing machine were incorporated into such machines. Color balancing, digital removal of scratches or dust, mass duplication of image elements, "healing" areas by copying adjacent pixels, and correction of lens aberrations are examples of such enhancements.

A common problem for imaging, including digital imaging, is that missing data cannot be recovered. Early consumer digital cameras captured images by reading the raw image data from the CCD, CMOS, or other imaging chip, sometimes altering the image such as by performing sharpening or color correction, then converting the image to a compressed format, such as the "JPEG" format developed by the Joint Photographic Experts Group. With each alteration, and with each compression to a non-lossless format, some data is lost. In many cases, desired data was never captured by the sensor or never transferred from the sensor to a storage device, such as where a portion of an image is captured with too few pixels, when there is insufficient light, where there is too much light, where a desired image element is not in focus, where a desired image element is larger than can fit on the camera's sensor (in light of the lens used), where image composition is such that a desired image element was not captured within the frame, where the aspect ratio of the photograph is such that when printed or viewed in a different aspect ratio, the user would need to either crop desired data or include areas where no data was captured, or where a desired image element is partially or fully obscured.

Newer imaging techniques have attempted to mitigate these problems. For example, many professional or high end consumer cameras now permit users to capture data in a "raw" format, avoiding certain of the data losses associated with in-camera processing and compression. Similarly, some digital editing machines are designed to utilize rudimentary techniques to recreate data that is missing from an image being edited.

The problem of insufficient resolution for printing or display has been imperfectly addressed by certain imaging devices that digitally estimate what the missing pixels should have consisted of. For example, on One Software's Genuine Fractals (now called Perfect Resize) used fractal-based interpolation algorithms to improve sharpness and detail in enlarged images where the image has been enlarged to include a number of pixels greater than the number of pixels present in the original, pre-enlargement image data. While highly sophisticated algorithms may improve the appearance of photographs by guessing as to what the content of missing pixels should be, guessing as to the content of missing data will always yield inferior results to utilizing the actual data.

The problem of insufficient data when working with a digital image is not limited to artifacts created when enlarging the image. There are often obscured objects or elements, out of focus objects, objects that are subject to motion blur, elements behind objects that the editor desires to remove from the image, and other data that the editor wishes to be able to incorporate, manipulate or utilize but that is not present in the original dataset. Similarly, there are often objects or elements that are present, but that are not desirable, or are in a form that is not desirable. As an example, there may be a photograph of children playing on grass, but the grass may have a significant number of brown patches. Alternatively, there may be a photograph of a façade, but the façade has graffiti or dirt on it. Alternatively, there may be a photograph of a family in front of a monument, but other persons may undesirably also be present in the photograph.

A technique from the film era to eliminate moving objects from a photograph is to utilize low sensitivity film (or, if implemented in digital cameras, a low sensitivity sensor), a dark filter, a low light environment, a small aperture (a "small aperture" refers to the actual aperture size and not to the "F stop" number, which is expressed as a denominator of a fraction where 1 is the numerator so that a higher F stop corresponds to a smaller aperture), or a combination, to allow a sufficiently long exposure that moving elements such as other tourists in a photograph of a monument, are effectively rendered invisible or nearly invisible in the photograph. While this technique continues to have utility in the digital era, the problem it is intended to solve has no equivalently effective post-image-capture digital editing machine solution. In any event, this technique is not amenable to capturing human, animal, or other elements that may experience some motion during a long exposure, results in an accumulation of noise on digital sensors, cannot be utilized where light sources move through the scene during capture, cannot be achieved with a handheld camera, and cannot be used to capture data behind objects that are obscured by stationary objects.

Digital image manipulation has been used to attempt to eliminate undesirable objects, moving or stationary, from photographs, or to create additional data that appears as if it were captured as part of the original photograph. A common technique for digital image manipulation has been to clone pixels from an adjacent area and use them to fill in a portion of a digital image where the extent data is undesirable or insufficient. These techniques have become increasingly sophisticated, and in certain implementations the digital editing apparatus will automatically identify pixels, based on certain algorithms, to fill in areas that the editor identifies as undesirable. For example, Adobe's™ "Photoshop CS5™" introduced a feature called "Content-Aware Fill". Content-Aware Fill enables a user to identify unwanted areas in an image, by having the user identify an area to remove from an image, and then digitally fills in the space left behind using data from surrounding pixels. While the algorithms utilized in such techniques have improved, they frequently result in image elements that do not look realistic or that are not true to the actual scene captured in the photograph.

Similarly, out of focus elements may be somewhat corrected by utilizing "sharpening" tools and digital sensor noise may be somewhat corrected by utilizing noise reduction tools. However, the existing art does not adequately meet the needs of photographers.

Additionally, selection of objects for editing, copying or other purposes presents significant problems for humans and for automated devices (an object or element to be selected is sometimes referenced as the "Target Object"). Objects often blend into the background or other objects, making selection difficult. For example, a person with black hair and a green shirt standing in front of a darkened bush presents selection problems in differentiating between green leaves and green shirt, or black hair and black shadows. In another example, a person standing in front of another person presents significant challenges to automated selection processes. When a selected object is copied from a first image and inserted into a second image, elimination of fringing or other elements from the first image and blending of the object into the second image is difficult to accomplish. In particular, the properties of light, the optical properties of the camera, and the separation, color and light blending between the object and the portion of the image onto which it is copied frequently result in an inability for existing editing systems to realistically insert and/or blend the object.

The existing art may benefit from increasingly sophisticated algorithms, but falls short of meeting the needs of photographers and image professionals when trying to reconstruct data from an imperfect or incomplete data set. There exists a need in the art for tools that improve the ability to edit images where the data set is imperfect or incomplete.

A method or digital editing machine for editing a digital image (the terms "photograph" and "image" when used herein are used interchangeably and are intended to reference both digital photographs and digital images) is disclosed whereby the method or machine fills in missing data in a digital image by utilizing other suitable images or data sources. Rather than rely on extent data within a single image, an embodiment disclosed herein identifies data in other images that is likely similar or identical to the missing data in the image being edited, and utilizes that data directly or to guide in reconstruction of missing data. To this end, it is further contemplated that video streams may also be edited (e.g., to remove undesired obstructions, enhance video/sound quality, etc.) by aggregating multiple video streams of a common event, wherein such editing and/or aggregation of data can be performed in real-time, for example.

The proliferation of digital photographs and images on the internet has created an enormous repository of photographic and image data. Techniques have been developed for searching for digital images, such as that taught in U.S. Pat. No. 7,460,737, which is hereby incorporated by reference in its entirety. Images are also frequently accompanied by metadata, which is data about the photograph, such as GPS coordinates for where the photograph was taken or the time and data the photograph was taken. Facial and image recognition techniques, combined with metadata and other search technology make it possible to identify images meeting set criteria.

There has also been some standardization of copyright licenses. Creative Commons, for example, has a set of standardized licenses as described at http://creativecommons.org/licenses/. Standardized licenses have increasingly found their way into online image repositories, such as Flickr™. Indeed, Google™ has implemented a method to search for images that are licensed for non-commercial reuse, commercial reuse, and the creation of derivative works, by using advanced search options at http://www.google.com/advanced_image_search.

In an embodiment, the digital editing machine is utilized to reconstruct data that is missing from an image. The user may instruct the digital editing machine as to some or all of the characteristics of the image being edited or the data desired, and the digital editing machine may determine some or all of the remaining characteristics utilizing facial and image recognition techniques or metadata. The user may provide to the digital editing machine some or all of the photographs to be utilized as sources of additional data or sources of information for recreation of additional data, or the digital editing machine may search for some or all of the photographs to be so utilized. The search may include locally stored images, images matching manually set criteria or user preferences, images available at one or more internet repositories or search facilities, or a combination. The machine may also utilize a list of reference or stock images. A single effort to locate appropriate additional images may be made for all editing of the image, or different searches may be executed to locate appropriate images for each element being edited or enhanced.

The type of editing desired is preferably utilized to determine which image or images are appropriate to utilize. For example, if a photograph of a family in front of the Washington Monument was taken on a foggy day and the user wants to make the Washington Monument appear more clear then, light, color, white balance, angle or point of view, time of day, day of year, sun position, GPS data, metadata, shadow characteristics, clarity, resolution, and other image characteristics may be utilized to determine which image or images that include the Washington Monument provide the best source of replacement or enhancement data (herein, the term "Reference Images" or "Reference Photographs" refers to the one or more images or photographs used to assist in the editing of a primary image or photograph; the primary image or photograph may be referenced herein as the "Edited Photograph", "Edited Image", "Subject Photograph", or "Subject Image").

An embodiment utilizes an averaging technique to determine the average characteristics of a particular place, target, or type of photograph. Measurements are made across a range of photographs of the place, target, or type. Such photographs may be grouped by one or more categories that are relevant to the image characteristics, such as time of day, latitude or longitude, time of year, photographic equipment, aperture, exposure period, ISO-equivalent light sensitivity, presence, absence or degree of post-processing, color space, editing software previously used on the image, focal length, depth of field/focus, focal point, presence, absence or degree of non-lossless compression, weather conditions as determined by GPS or other location data combined with date and time of photography combined with historical records, weather conditions as determined by image analysis (such as by observing rain in the photograph, clouds in the photographs, distinctive shadows of clouds, white balance points indicating clouds, or similar indicia) or similar characteristics. Within each group, an average white balance point (for example, 5,500 Kelvin) may be determined. Similarly, average amounts of atmospheric light scattering, shadow, glare from reflective surfaces, motion blur on elements in the photograph (for example, a set of photographs of the 405 freeway would have an average amount of motion blur in cars and other moving objects), reflected light (and color of reflected light, such as might be expected in a photograph taken across from a building with green tinted windows), and other elements may all be determined. These averages (or, where appropriate, median amounts or ranges) are then used to better guide image editing, wherein such averages taken from whole photos, one or more areas of a photo, and/or one or more objects of a photo. For example, if the average white balance among 5,000 photographs taken of the White House at 4:00 pm on a sunny day in the first week of July was 6,125, the system could correct a similar photograph to a while balance of 6,125. Similarly, a range of values (for example, one standard deviation of white balance for such photographs) could be used to determine when to warn a photographer that he is substantially out of the appropriate range. In an embodiment, characteristics of the photographic equipment used to generate each image (for example, the metadata may indicate that a particular image was taken with a Canon 5D Mark II using a 24-105L lens at a 4.0 aperture with a shutter speed of 400 and an ISO equivalent of 200) may be used to correct the data being averaged. If, for example, Canon cameras typically render a scene with a slightly warmer color temperature than a Nikon, this bias would be corrected for. This correction is particularly useful when images have been manually corrected for color balance, such as images with file names or metadata that indicate that they were converted from a raw format. In an embodiment, only images taken under similar circumstances that have been corrected for a characteristic would be utilized in generating an average or modal correction or value, and that correction or value would be applied (or recommended for application) to the image being edited.

In selecting reference images, various methods may be used including, but not limited to, crowd sourcing, peer, manual scoring, Google page rank, link back, or other scoring data for images or web pages that include images to enable identification, use, and/or retrieval of images and/or objects within images that meet one or more desired criteria.

As described later, it is important to be able to match data from other photographs to a photograph being edited. The averaging mechanism described above can be used to correct the photograph being edited in a manner that makes it able to incorporate content, including aggregated content, from the largest number of available reference images. As an alternative, a universe of reference images most closely matching the characteristics of the image being edited may be used as the totality of the reference images used as sources of replacement data.

In situations where the desired editing mode is to incorporate pixels from the Reference Images into the Edited Photograph, or when otherwise desirable (such as when there are concerns about copyright law compliance), the machine may identify candidate Reference Images from within a universe of images that bear a specified copyright status, may exclude images that bear a specified copyright status (where one status may be unknown license terms), or may gather images with various copyright statuses. In an embodiment, images are utilized only in a manner that complies with copyright law.

Editing modes may include one or a combination of:

1. Incorporation of pixels from the Reference Images into the Edited Photograph;

2. Identification of candidate elements for editing or removal from an image based on comparison of the Edited Photograph to the Reference Images to determine the elements present in a plurality of the Reference Images by not present in the Edited Photograph (or the inverse);

3. Utilization of the Reference Images, including averaging of content, to determine elements present and appropriate white balance, lighting, color, noise, and similar corrections;

4. Identification of appropriate replacement pixels from within the Edited Image, or from within Reference Images bearing appropriate copyright license status, by viewing pixels or other image elements in Reference Images. For example, consider a case where only a single Reference Image taken at a specific location is found and the user wishes to remove a car present in the Edited Image but not present in the Reference Image. Consider that the Reference image is not suitable for copying because of copyright concerns or intrinsic qualities such as a low pixel count. The user may identify the car as an element for the machine to remove, and the machine would then utilize the information found in the Reference Image about what is located behind the car in order to better inform its execution of other editing techniques, such as "Content-Aware Fill". Utilizing such data, for example, may allow the machine to know where a fence running behind the car should end. In an embodiment, the use of such Reference Image information is limited to that allowed under copyright law.

5. Incorporation of a composite of pixels from various Reference Images into the Edited Image, where no single Reference Image is the source of a sufficient number of pixels as to constitute copyright infringement.

6. Use of tools to remove noise, sharpen elements, remove blur and otherwise alter an image, where the settings used to accomplish those goals are cycled or altered until the result is the closest result to the appearance of the Reference Image.

7. Identification of the N most useful reference images and where the copyright status and other considerations prevent the use of any one such image, search and identification of the closest matching image to such restricted image can be used to substitute the restricted image.

Where there are copyright concerns, it may be desirable to draw pixels from a plurality of Reference Images, so that no single Reference Image has a sufficient quantity of content copied so as to violate copyright law. Additionally, it may be desirable to use averaging or blending techniques to identify and extract elements common to a plurality of Reference Images, which common elements would lack sufficient creative qualities to qualify for copyright protection. In one implementation, a random algorithm may be utilized to determine the source of any given pixel from within a universe of the pixels comprising identical or nearly identical image elements.

The machine, whether based on user preferences, user instructions, algorithmic determination, or a combination, may identify a plurality of desired editing approaches, and implement the most desirable approach for which an appropriate Reference Image may be found. For example, if the most desirable editing approach for removing tourists from an image of the White House is to use pixels from Reference Images to directly overlay the undesirable tourists, and the machine is instructed that the intended use of the Edited Image is commercial, the machine may search only a library of images that are in the public domain or bear a copyright for which the user of the Edited Image has or is willing to obtain a license. Where the license type includes attribution (for example, a Creative Commons Attribution license), the machine preferably obtains and makes available to the user the attribution information. Where the license type has other limitations, the machine also preferably obtains and makes available to the user information relevant to such limitations.

In an embodiment, Reference Images are identified for each of a plurality of editing modes.

Where a Reference Image taken from the same vantage point is available, use of such an image is preferable. Where it is not possible, changes to perspective of the one or more Reference Images may be made to more closely match the Edited Image.

Where no appropriate image can be identified for the preferred editing mode, whether because of copyright issues or because the available Reference Images have characteristics that indicate that the preferred editing mode, performed with the available Reference Images, will result in a lower quality result than use of a less preferred editing mode utilizing Reference Images available for that technique, the machine preferably utilizes the otherwise less preferred technique. In one implementation, fully processed results, or preliminary results, are created and presented to the user so that the user may determine which of the plurality of techniques to utilize. Such results may also be presented together with limitations on use imposed by the copyright license data that was gathered.

Reference Images may be made more suitable for use by altering the point of view, angle, or other characteristics. Such alterations may be made by reference to the Edited Image or other Reference Images or images that would be Reference Images if the Reference Image being altered were used as an Edited Image.

Reference Images may also be aggregated in order to improve quality, identify and remove elements or noise, or increase the megapixel count. The criteria for selecting may additionally include searching for identical or similar camera and/or lens characteristics between the Edited Image and the Reference Image. Where there are multiple images that could serve as the Edited Image (as when a user takes multiple images), the machine may evaluate the relative suitability of the plurality of Edited Images for editing by comparing the match between the Edited Images and the available Reference Images for each.

A clearinghouse or similar licensing model may be utilized where copyright holders make images available for the user of the machine to license for use. The license fee may be based on the editing mode, the amount of the image being utilized, the number of Reference Images being utilized, the type and length of rights being acquired, the increase in rights being acquired over the existing license (for example, elimination of the attribution requirement in a Creative Commons Attribution license), the relative importance of the licensed Reference Image among the Reference Images being used, or a combination. Licensing fees may be split among Reference Image copyright holders, and such split may be based in whole or part on the same factors described above as influencing license price.

Additionally, it may be desirable to add an element to a digital image or to select a Target Object from a digital image. Selection of the Target Object may be accomplished by identifying one or more Reference Images containing an element similar or identical to the element the Target Object (the one or more elements similar or identical to the Target Object may be referenced herein as Reference Objects). In an embodiment, the object or element that is ultimately selected or copied is comprised of pixels from the Edited Image, but it may be comprised of pixels from one or more Reference Images, a combination of pixels from the Edited Image or one or more Reference Images, or a combination of pixels from one or more Reference Images and the Edited Image. In certain cases, it may be advantageous to select or copy a portion of the Target Object and a portion of one or more Reference Objects to create a composite suitable for copying, pasting, or other use. Note further that the Target Object may be located on an image other than an Edited Image on which it is intended to be inserted.

Once a Target Object and one or more Reference Objects have been identified, common elements in the Target Object and Reference Objects are identified. Similarly, differences between the elements at the borders or edges of the Target Object and Reference Objects are identified. Commonalities or differences in elements at the transition point from the Target Object or Reference Object to other photographic elements in at least two of the images are utilized to identify likely edges of the Target Object (or Reference Objects).

For this purpose, it may be advantageous to utilize Reference Objects drawn from images with a variety of backgrounds and other qualities. Similarly, it may be advantageous to utilize Reference Objects drawn from images with a background or other qualities that differ from the image from which the Target Object is to be selected.

As an example, if the Target Object is child standing in front of a background with many other children, the Reference Objects may be drawn from a group of ten other photographs of that child, preferably at approximately the same age and preferably in a similar orientation to the camera, taken in front of a variety of backgrounds. The Target Object, by itself, would be difficult to correctly select, as the skin tones of the child would match those of the other children, the hair (an already difficult element to select) might overlap hair of other children, and perhaps portions of the child may be obscured in the image. By comparing the transition from child to background in the image containing the Target Object and in the images containing the Reference Objects, the machine can identify the transition points between the Target Object and the other elements in the photograph. Similarly, obscured elements in the Target Object may be filled in utilizing pixels from the Reference Objects, or filled in using information gained from the Reference Objects to guide the generation of new pixels or copying of appropriate pixels or elements from the photograph containing the Target Object.

In an embodiment, image analysis is utilized to identify a plurality of potential Target Objects within an image. Images available for identification of Reference Objects, such as a database of images, are then utilized or searched to identify Reference Objects that may match one or more Target Objects. The one or more Target Objects that are capable of being selected based on the differencing/similarity analysis described above are identified to the user. Alternatively, Target Objects that are capable of having their selection assisted based on the differencing/similarity analysis described above may be identified to the user. A list, menu, photographic inventory, or highlighted or otherwise marked areas on one or more images, may be used to identify the potential Target Objects to the user.

In another embodiment, the projected accuracy of the selection process may be indicated to the user or may be utilized in determining how and whether to present the Target Object(s) to the user.

In a further embodiment, a collection of photographs may be analyzed to identify all of the Target Objects available within the collection. A minimum confidence or quality cutoff may be utilized to determine which Target Objects to present. Where the collection of photographs involves a lot of photographs of similar elements (such as a collection of family photographs, which would include multiple photographs of family members and family possessions), identification of Target Objects from within the collection may be done by comparing images within the collection. The selection may be enhanced by utilizing additional images not within the collection. In an aspect, a user may identify a desirable person or object to be a Target Object, and by using image identification or facial recognition, only Target Objects that are the person or object desired, or which are scored as likely to be the person or object desired, are analyzed for isolation as Target Objects and presented to the user. Alternatively, the analysis may extend beyond only candidates to match the person or object desired, but the presentation of the results may be limited to those scored as likely to be the person or object desired.

In another implementation, analysis is done of the place where the Target Object is intended to be used, for example by pasting an image of a child who is the Target Object into a certain photograph. The analysis of the background and other characteristics of the image (and the place on the image) on which the Target Object is intended to be placed may be utilized to identify which of a plurality of potential Target Objects should be identified, based on likelihood that the ultimately identified Target Objects will blend properly into the image on which they are intended to be used. Thus, for example, if the Target Object will be pasted onto a photograph taken at noon on a beach, the search for Target Objects would more heavily weight potential Target Objects where the light source is overhead and the color temperature matches the color temperature in the photo where the Target Object will be pasted.

Additionally, the Target Object and one or more Reference Objects may be compared to determine the opacity, light reflection or refraction, or other characteristics of their borders or other elements. For example, if the Target Object is a leaf, there may be strong opacity toward the center of the leaf and weak opacity toward the edge of the leaf. The edge of the leaf may have a certain lensing effect on light coming from behind it. The surface of the leaf may reflect N % of the ambient light hitting it. By comparing the Target Object and at least one Reference object, these characteristics may be fully or partially quantified. Once quantified, incorporation of the Target Object into an image may be enhanced by utilizing those characteristics in blending the edges of the Target Object, adjusting the color and tonal characteristics of the Target Object, and otherwise adapting the Target Object to the image, and the image to the Target Object, to make the resulting composite image appear more realistic.

The Reference Objects may be identified by the ease with which they can be isolated from other elements in the images they are drawn from. For example, a dog used as a Reference Object photographed in front of a solid green wall would be easily isolated from the other elements in the image, while the same dog running among a pack of similar dogs would be very difficult to isolate.

Reference Objects may be made more useful by identifying one or more Reference Objects as Primary Reference Objects for some or all of the Reference Object element. Using a dog as an example, a Reference Object dog found in one image may include the face of the dog in nearly identical posture to the face of the Target Object dog. A second Reference Object dog may include the torso of the dog in a nearly identical posture to the Target Object dog, while a third may include the tail of the dog in a nearly identical posture to the Target Object dog. A series fourth, fifth, and sixth Reference Object dogs may be posed in front of a uniformly colored background and easily isolated. The first Reference Object dog would become the primary Reference Object for the face, the second would become the primary Reference Object for the torso, the third would become the primary Reference Object for the tail, and the fourth, fifth and sixth would become the primary Reference Objects for the edges of the dog (where the Target Object blends into the other photographic elements). The software utilizes the Primary Reference Object as the baseline, filling in additional data from other, secondary Reference Objects where necessary.

In making any adjustments to the Target Image, the system may analyze the level of focus blur (or other blur or other characteristics) to match the replacement pixels properly. For example, if the Target Object is blurred in a manner that would be consistent with a Canon 50 mm lens opened to a 2.8 aperture and focused ten feet behind the Target Object, Reference Objects with similar or identical characteristics may be utilized.

For storage or transmission of images, video or audio, the system may be utilized to enhance compression or improve the resolution of an image compressed using a "lossy" compression method. For example, if there were a photograph of a child sitting on a grassy lawn, the system may identify the areas of the lawn that are grass, record appropriate additional data (such as color of the grass, color variations, type of grass, closest reference image matches, resolution of the grass) and then replace some or all of the grass in the image with blank data or a placeholder. The blank data or placeholder is far more compressible than an actual image of grass, allowing for the more efficient storage of images. Similarly, transmission of a video signal would require less bandwidth where elements of the image may be transmitted in the form of directions for reconstructing those portions (potentially including the identity of the reference image or video, particularly where the reference image or video is present in a reference library). Once the image or video has reached its destination (or when the image or video is to be decompressed for use), the system would reconstruct the image using the methods described herein.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. In an exemplary embodiment, various aspects disclosed herein can be implemented in-camera. For instance, where the camera has a network connection (such as a smart phone or a dedicated camera with wifi), reference files can come from an online database. Alternatively, even for a non-networked camera, reference files could come from a stock collection of reference files within the camera.

One of ordinary skill in the art will appreciate that the embodiments disclosed herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 5:
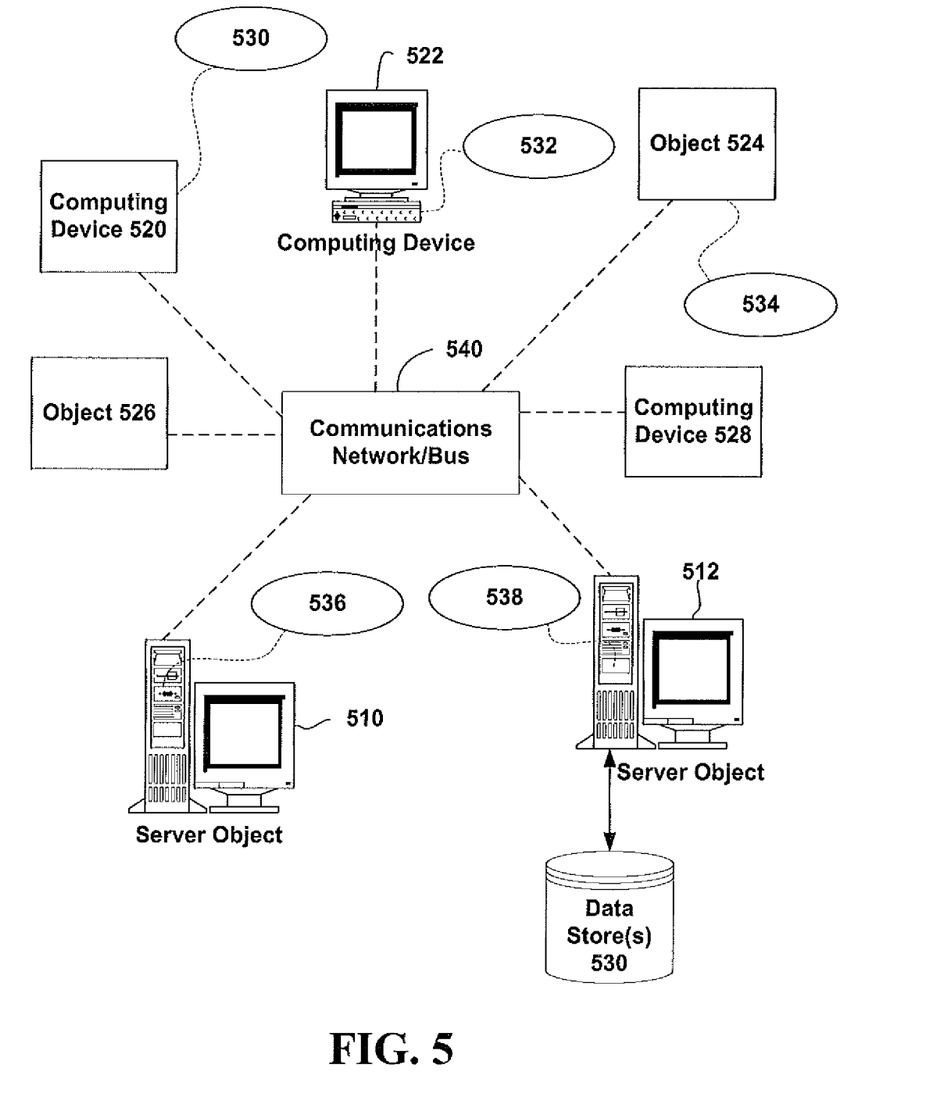
FIG. 5 is a block diagram representing exemplary non-limiting networked environments in which various embodiments described herein can be implemented.

FIG. 5 provides a non-limiting schematic diagram of an exemplary networked or distributed computing environment. The distributed computing environment comprises computing objects or devices 510, 512, etc. and computing objects or devices 520, 522, 524, 526, 528, etc., which may include programs, methods, data stores, programmable logic, etc., as represented by applications 530, 532, 534, 536, 538. It can be appreciated that computing objects or devices 510, 512, etc. and computing objects or devices 520, 522, 524, 526, 528, etc. may comprise different devices, such as PDAs (personal digital assistants), audio/video devices, mobile phones, MP3 players, laptops, etc.

Each computing object or device 510, 512, etc. and computing objects or devices 520, 522, 524, 526, 528, etc. can communicate with one or more other computing objects or devices 510, 512, etc. and computing objects or devices 520, 522, 524, 526, 528, etc. by way of the communications network 540, either directly or indirectly. Even though illustrated as a single element in FIG. 5, network 540 may comprise other computing objects and computing devices that provide services to the system of FIG. 5, and/or may represent multiple interconnected networks, which are not shown. Each computing object or device 510, 512, etc. or 520, 522, 524, 526, 528, etc. can also contain an application, such as applications 530, 532, 534, 536, 538, that might make use of an API (application programming interface), or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects or devices 510, 512, etc. can be thought of as servers where computing objects or devices 510, 512, etc. provide data services, such as receiving data from computing objects or devices 520, 522, 524, 526, 528, etc., storing of data, processing of data, transmitting data to computing objects or devices 520, 522, 524, 526, 528, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 540 is the Internet, for example, the computing objects or devices 510, 512, etc. can be Web servers with which the computing objects or devices 520, 522, 524, 526, 528, etc. communicate via any of a number of known protocols, such as HTTP. As mentioned, computing objects or devices 510, 512, etc. may also serve as computing objects or devices 520, 522, 524, 526, 528, etc., or vice versa, as may be characteristic of a distributed computing environment.

Exemplary Computing Device

As mentioned, several of the aforementioned embodiments apply to any device wherein it may be desirable to utilize a computing device to modify a linguistic expression according to the aspects disclosed herein. It is understood, therefore, that handheld, portable and other computing devices and computing objects of all kinds are contemplated for use in connection with the various embodiments described herein, i.e., anywhere that a device may provide some functionality in connection with modifying a linguistic expression. Accordingly, the below general purpose remote computer described below in FIG. 6 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 6:
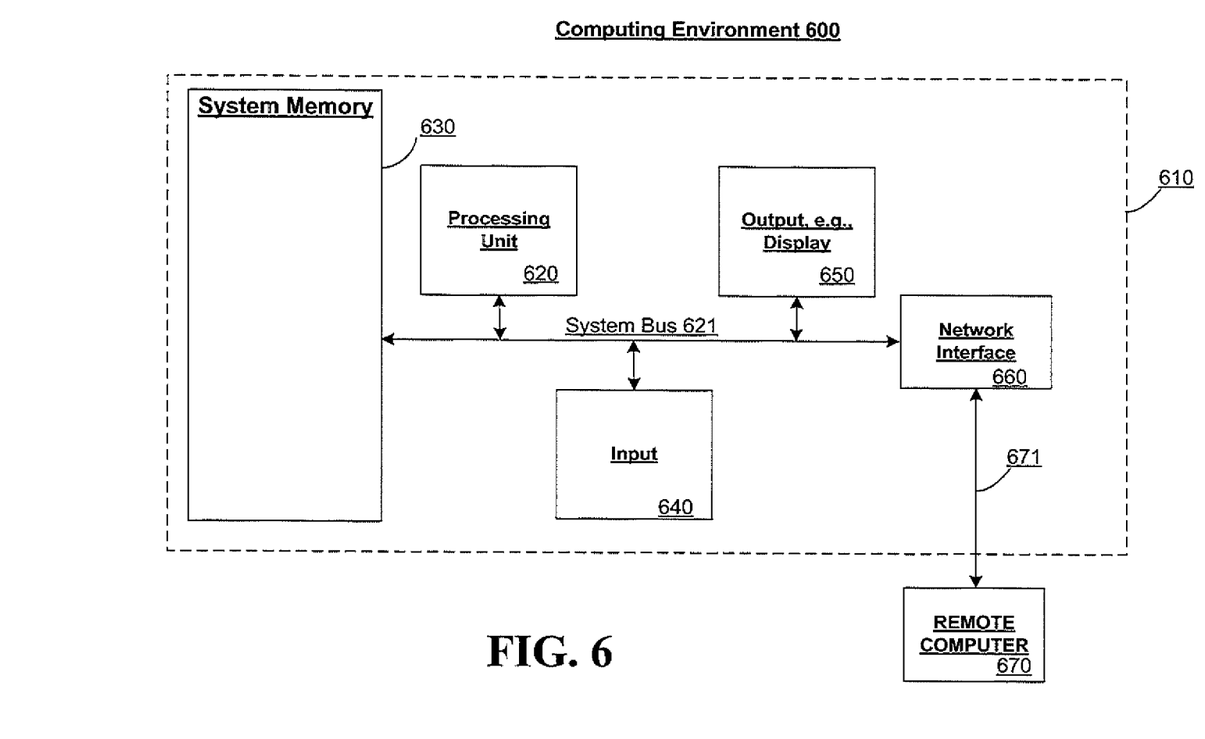
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or more of the embodiments may be implemented, although as made clear above, the computing system environment 600 is only one example of a suitable computing environment and is not intended to suggest any limitation as to the scope of use or functionality of any of the embodiments. The computing environment 600 is not to be interpreted as having any dependency or requirement relating to any one or combination of components illustrated in the exemplary operating environment 600.

With reference to FIG. 6, an exemplary remote device for implementing one or more embodiments herein can include a general purpose computing device in the form of a handheld computer 610. Components of handheld computer 610 may include, but are not limited to, a processing unit 620, a system memory 630, and a system bus 621 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, memory 630 may also include an operating system, application programs, other program modules, and program data.

A user may enter commands and information into the computer 610 through input devices 640 A monitor or other type of display device is also connected to the system bus 621 via an interface, such as output interface 650. In addition to a monitor, computers may also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 671, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and networks, the underlying concepts may be applied to any network system and any computing device or system in which it is desirable to publish, build applications for or consume data in connection with modifying a linguistic expression.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates enhancing digital media in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

What is claimed is:

1. A device, comprising:
    a computer;
    a computer readable memory having one or more computer executable components stored thereon; and
    a processor configured to execute the one or more computer executable components in order to cause the computer to perform actions comprising:
        identifying a target object in a primary image;
        searching a plurality of images by parsing metadata associated with the plurality of images to locate at least one reference image, wherein the at least one reference image includes at least a portion of the target object and wherein the metadata parsed comprises timestamp, photographer identity, photographic equipment, aperture, exposure period, ISO/light sensitivity, post-processing, focal point and/or focal length data; and
        modifying at least one characteristic of the target object within the primary image according to data derived from an analysis of the at least one reference image.

2. The device of claim 1, wherein the processor is also configured to determine whether the at least one reference file is subject to copyright protection.

3. The device of claim 2, wherein the reference file(s) that are determined to be subject to copyright protection and not licensed for use in modifying the target object ("copyrighted reference files") are utilized to guide or error-check the modifying of at least one characteristic of the target object without incorporating portions of the copyrighted reference files into the target object.

4. The device of claim 1, wherein portions of the reference files that are substantially similar across more than a set number of the reference files greater than one are combined and incorporated into the primary image.

5. The device of claim 1, wherein the portions of at least two of the reference files that are substantially similar are utilized to generate a composite of pixels or other data for incorporation into the primary image, wherein no single reference file is the source of a sufficient amount of pixels or other data as to constitute copyright infringement when incorporated into the primary image.

6. The device of claim 1, wherein the reference files are prioritized for use according to their copyright status.

7. A device, comprising:
    a computer;
    a computer readable memory having one or more computer executable components stored thereon; and
    a processor configured to execute the one or more computer executable components in order to cause the computer to perform actions comprising:
        receiving a primary digital file;
        referencing at least one reference digital file; and generating enhancement data from an extrapolation of the primary digital file data by comparing data from the at least one reference digital file, wherein the enhancement data facilitates enhancing an aspect of the primary digital file.

8. The device of claim 7, wherein the primary digital file or the at least one reference digital file is a video stream.

9. The device of claim 7, wherein the enhancement data facilitates enhancing an audio portion of the primary digital file by removing an audio obstruction, not contained in the at least one reference digital file.

10. The device of claim 7, wherein the enhancing comprises providing a surround sound effect from a plurality of reference files.

11. The device of claim 7 further comprising:
analyzing a portion of the primary digital file, wherein the portion comprises narrative information;
determining a likely meaning of the analyzed portion;
searching at least one source for one or more images that correspond to the likely meaning of the analyzed portion; and wherein the enhancement data is an illustration or animation generated from the one or more images.

12. The device of claim 11, wherein the illustration or animation is one or more image file(s), or video file(s).

13. A device, comprising:
a computer;
a computer readable memory having one or more computer executable components stored thereon; and
a processor configured to execute the one or more computer executable components in order to cause the computer to perform actions comprising:
creating a network or accessing an existing network;
utilizing the network to facilitate aggregating substantially in real time a plurality of digital media files corresponding to a common event, where each of at least two of the digital media files were created utilizing separate digital media capture devices;
identifying a desired enhancement of a primary digital media file, the desired enhancement corresponding to a modification of data associated with an obstruction included in the primary digital media file;
referencing at least one reference file, the at least one reference file included in the plurality of digital media files, wherein the at least one reference file includes data associated with the desired enhancement; and
modifying the data associated with the obstruction included in the primary digital media file based on-replacement enhancement data extrapolated from the at least one reference file.

14. The device of claim 13, wherein the processor is further configured to determine whether the at least one reference file is subject to copyright protection.

15. The device of claim 13, wherein the desired enhancement comprises removing a visual obstruction from an obstructed portion of the primary digital media file, the enhancement data corresponding to a portion of the primary image file that is obscured by the visual obstruction.

16. The device of claim 15, wherein the aggregating comprises aggregating location data respectively associated with each of the plurality of digital media files, and wherein the modifying comprises extrapolating the inferred image based at least in part on a first geographic location associated with the primary digital media file relative to a second geographic location associated with the at least one reference file.

17. The device of claim 16 wherein the first and second geographic locations also include, respectively, first and second directions in which image acquisition devices were pointing at the time the primary digital file and at least one reference files were created.

18. The device of claim 13, wherein the desired enhancement comprises removing an audio obstruction from an obstructed portion of the primary digital media file, the enhancement data corresponding to the reference file without the audio obstruction.

19. The device of claim 13, wherein the modifying further comprises synchronizing the primary digital media file with the at least one reference file.

20. The device of claim 13, wherein modifying the data associated with the obstruction included in the primary digital media file takes place substantially in real time.

* * * * *